(12) United States Patent
Sugiyama et al.

(10) Patent No.: US 9,231,454 B2
(45) Date of Patent: Jan. 5, 2016

(54) MOTOR PROVIDED WITH A PRINTED CIRCUIT BOARD

(71) Applicant: Nidec Corporation, Kyoto (JP)

(72) Inventors: Tomotsugu Sugiyama, Kyoto (JP); Hidenobu Takeshita, Kyoto (JP); Tsukasa Takaoka, Kyoto (JP); Norihisa Hino, Kyoto (JP); Libin Zhu, Dongguan (CN); Xianglin Li, Dongguan (CN); Yu Chen, Dongguan (CN)

(73) Assignee: NIDEC CORPORATION, Kyoto (JP)

( * ) Notice: Subject to any disclaimer, the term of this patent is extended or adjusted under 35 U.S.C. 154(b) by 160 days.

(21) Appl. No.: 14/243,019

(22) Filed: Apr. 2, 2014

(65) Prior Publication Data
US 2014/0300255 A1    Oct. 9, 2014

(30) Foreign Application Priority Data

Apr. 9, 2013  (CN) .......................... 2013 1 0120398
Apr. 9, 2013  (CN) ....................... 2013 2 0173575 U (51) Int. Cl.
*H02K 11/00*   (2006.01)
*H02K 5/16*    (2006.01)

(52) U.S. Cl.
CPC ............ *H02K 11/0073* (2013.01); *H02K 5/163* (2013.01)

(58) Field of Classification Search
CPC .......... H02K 11/0073; H02K 11/0068; H02K 11/001; H02K 3/50
USPC ...................................................... 310/68 B
See application file for complete search history.

(56) References Cited

U.S. PATENT DOCUMENTS

| | | | | |
|---|---|---|---|---|
| 4,952,830 A * | 8/1990 | Shirakawa | ............. | H02K 29/08 310/68 B |
| 5,610,458 A * | 3/1997 | Baker | ..................... | F04D 25/08 310/68 R |
| 5,877,567 A * | 3/1999 | Moritan | .................... | H02K 3/18 310/268 |
| 6,097,121 A * | 8/2000 | Oku | ................... | G11B 19/2009 310/425 |
| 6,278,207 B1 * | 8/2001 | Matsumoto | ........... | F04D 29/083 310/68 R |
| 2008/0218010 A1 * | 9/2008 | Hino | ...................... | H02K 3/522 310/71 |

FOREIGN PATENT DOCUMENTS

JP    2007-166851 A    6/2007

* cited by examiner

*Primary Examiner* — Naishadh Desai
(74) *Attorney, Agent, or Firm* — Keating & Bennett, LLP (57) ABSTRACT

A motor includes a stationary unit, a rotary unit, and a bearing unit. The stationary unit includes a stator, a PCB and a base member. The stator includes a stator core and coils. The stator is arranged radially outward of the bearing unit. The PCB includes through-hole portions, land portions and PCB fixing portions. The base member includes a stator holding portion arranged to hold the stator and a bearing holding portion arranged to hold the bearing unit. The rotary unit includes a shaft positioned radially inward of the bearing unit and a magnet opposed to a circumferential surface of the stator core. The through-hole portions are arranged along a circumferential direction of the PCB. At least a portion of the PCB axially overlaps with the bearing unit. The PCB fixing portions are arranged radially outward of the through-hole portions.

16 Claims, 7 Drawing Sheets

MOTOR PROVIDED WITH A PRINTED CIRCUIT BOARD

BACKGROUND OF THE INVENTION

1. Field of the Invention

The present invention relates to a motor.

2. Description of the Related Art

Figure 6:
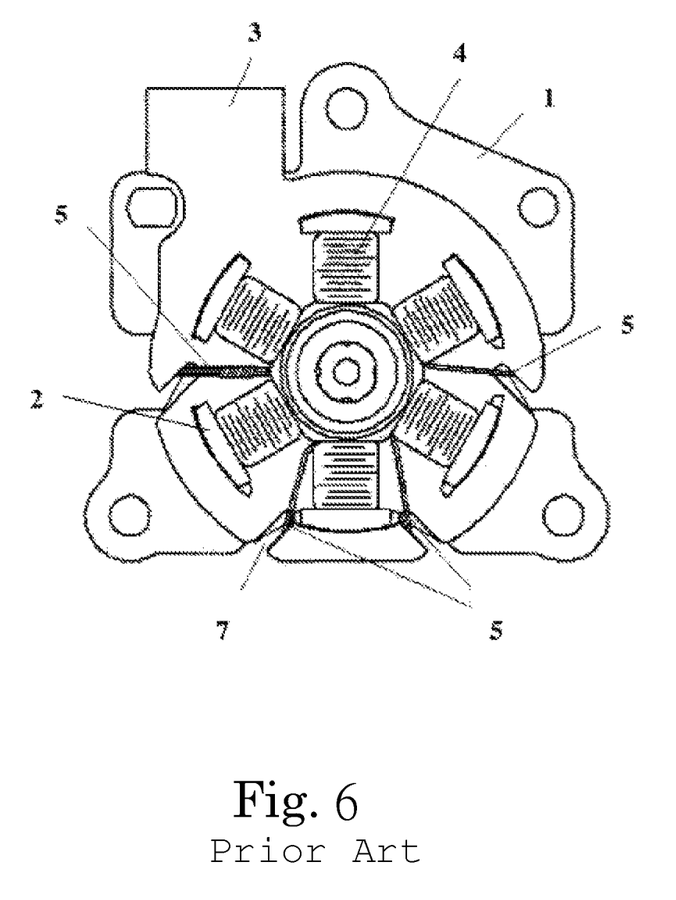
FIG. 6 is a front view of a conventional motor.
Figure 7:
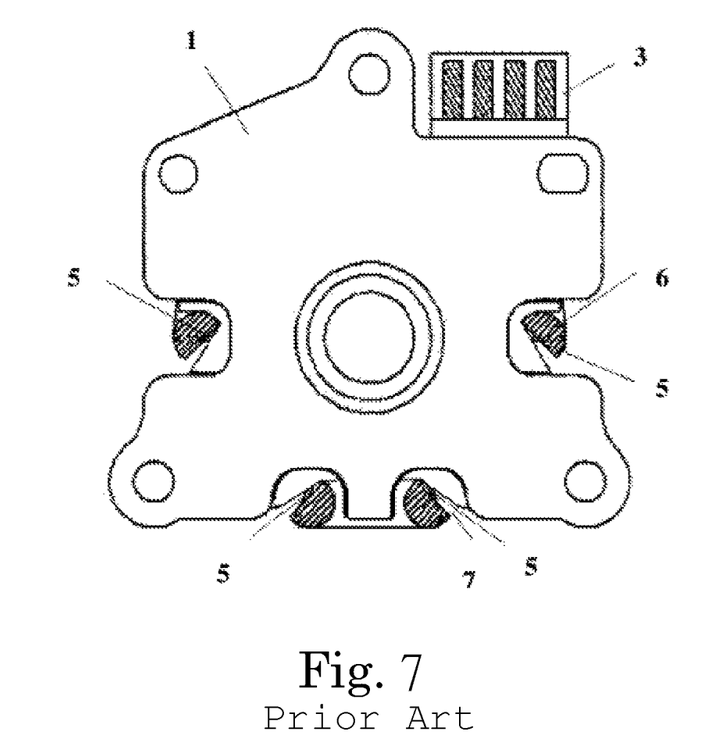
FIG. 7 is a rear view of the conventional motor.

Japanese Patent Application Publication No. 2007-166851 discloses a motor that includes a stationary unit, a rotary unit and a bearing unit. As shown in FIGS. 6 and 7, the stationary unit includes a housing 1, a stator core 2, a PCB (printed circuit board) 3 and coils 4. The PCB 3 is fixed to the housing 1 by an adhesive agent. The coils 4 are wound around the stator core 2 and are held in the housing 1 by press-fit or other methods. A cutout 7 is defined in an outer peripheral edge of the PCB 3. Lead wire terminals 5 of the coils 4 are arranged to pass through the cutout 7 and are soldered to lands 6 arranged on the lower surface of the PCB 3.

In the motor disclosed in the above-cited reference, a through-hole is defined at the center of the PCB 3 in order to install the PCB 3 in the central region of the housing 1. For that reason, the rigidity of the PCB 3 gets reduced. The lead wire terminals 5 make contact with the outer peripheral edge of the PCB 3, thereby applying a downward load to the PCB 3. As a result, there is posed a problem in that the PCB 3 is deformed downward.

SUMMARY OF THE INVENTION

A motor according to one illustrative preferred embodiment of the subject application includes a stationary unit, a rotary unit arranged to rotate with respect to the stationary unit about a center axis extending up and down, and a bearing unit. The stationary unit includes a stator, a PCB and a base member. The stator includes a stator core and coils defined by conductive wires wound around the stator core, the stator arranged radially outward of the bearing unit. The PCB includes a plurality of through-hole portions extending along the center axis, a plurality of land portions arranged on a lower surface of the PCB and a PCB fixing portion, the PCB arranged below the stator. The base member includes a stator holding portion arranged to hold the stator and a bearing holding portion arranged to hold the bearing unit. The rotary unit includes a shaft and a magnet. The shaft is positioned radially inward of the bearing unit and is rotatably supported by the bearing unit so as to rotate with respect to the stationary unit about the center axis. The magnet is opposed to a circumferential surface of the stator core. The through-hole portions are arranged along a circumferential direction of the PCB around the center axis. At least a portion of the PCB axially overlaps with the bearing unit. The PCB fixing portion is arranged radially outward of the through-hole portions. Lead wires led out from the coils are arranged to pass through the through-hole portions and are soldered to the land portions.

According to one illustrative preferred embodiment of the of the subject application, no through-hole is defined in or around the central region of the PCB of the motor. Even if there is defined a through-hole, the through-hole has such a small size that the shaft can pass through the through-hole. The PCB fixing portion is arranged radially outward of the through-hole through which the lead wires of the coils pass. It is therefore possible to reduce the load applied to the PCB, while increasing the rigidity of the PCB. As a consequence, it is possible to suppress or reduce deformation of the PCB.

The above and other elements, features, steps, characteristics and advantages of the present invention will become more apparent from the following detailed description of the preferred embodiments with reference to the attached drawings.

DESCRIPTION OF THE PREFERRED EMBODIMENTS

Illustrative preferred embodiments of the present invention will now be described with reference to the drawings which form a part hereof. Throughout the drawings, identical members or mechanisms are designated by like reference symbols. Identical members are not necessarily illustrated on the same scale. The below-described preferred embodiments and the drawings are presented merely by way of example and are not intended to limit the scope of the present invention.

In the subject specification, the terms indicating directions, such as upper, lower, inner, outer, and the like, are used to describe the preferred embodiments, by way of example, according to the azimuth of the drawings and are not intended to limit the present invention. The directions mentioned in the subject specification may differ from the actual directions and can be interpreted so that a person skilled in the relevant art can easily understand the directions.

Figure 1:
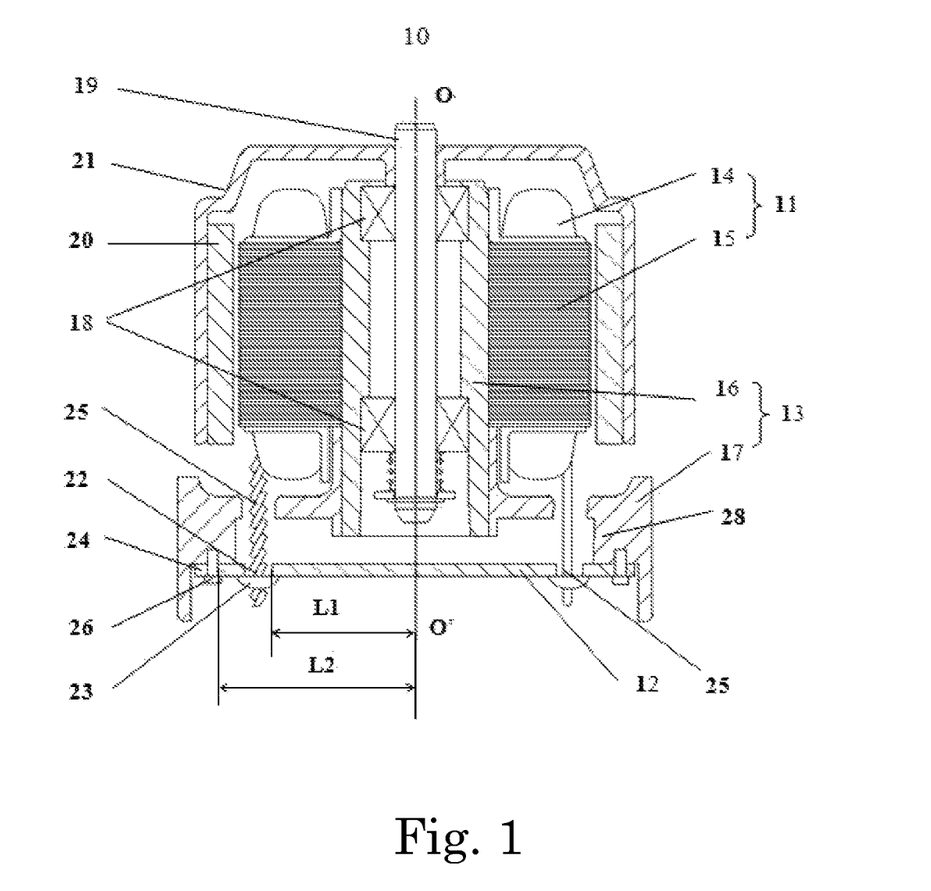
FIG. 1 is a sectional view of an outer-rotor-type motor according to one preferred embodiment.

FIG. 1 is a sectional view of an outer-rotor-type motor according to one preferred embodiment of the present invention. As shown in FIG. 1, the motor 10 preferably includes a stationary unit, a rotary unit arranged to rotate with respect to the stationary unit about a center axis O-O' extending up and down, and a bearing unit.

The stationary unit preferably includes a stator 11, a PCB 12 and a base member 13. The stator 11 preferably includes a stator core 14 and coils 15 defined by conductive wires wound around the stator core 14. The base member 13 preferably includes a tubular bearing holding portion 16 and a stator holding portion 17. The bearing unit preferably includes radial bearings 18 which are press-fitted and fixed to the inner surface of the bearing holding portion 16. The stator 11 is supported on the outer surface of the bearing holding portion 16 and is disposed radially outward of the bearing unit.

The rotary unit preferably includes a shaft 19, a magnet 20 and a rotor holder 21. The shaft 19 is positioned radially inward of the radial bearings 18 and is rotatably supported by the radial bearings 18 to rotate with respect to the stationary unit about the center axis O-O'. The magnet 20 is installed radially inward of the rotor holder 21. The magnet 20 is opposed to the outer circumferential surface of the stator core 14 and is positioned radially outward of the stator core 14.

The PCB 12 preferably includes a plurality of through-hole portions 22 extending along the center axis O-O', a plurality of land portions 23 arranged on the lower surface of the PCB 12, and a plurality of PCB fixing portions 24 for fixing the PCB 12 to the base member 13. The PCB 12 is arranged below the stator 11. The through-hole portions 22 are arranged along the circumferential direction around the center axis O-O'. The PCB fixing portions 24 are positioned radially outward of the through-hole portions 22. Lead wires 25 led out from the coils 15 are arranged to pass through the through-hole portions 22 and are soldered to the land portions 23.

Preferably, the number of the through-hole portions 22 and the number of the land portions 23 are equal to each other. Preferably, the distance L1 from the radial inner end of each of the through-hole portions 22 to the center axis O-O' is shorter than the distance L2 from the radial inner end of each of the PCB fixing portions 24 to the center axis O-O'. No through-hole is defined in or around the central region of the PCB 12. The PCB preferably includes a portion axially overlapping with the bearing unit. As shown in FIG. 1, the stator holding portion 17 preferably includes a radially-protruding seat 28. The PCB fixing portions 24 are fixed to the seat 28 of the stator holding portion 17 by, e.g., screws 26. The seat 28 is positioned radially outward of the through-hole portions 22.

In an alternative preferred embodiment, the PCB fixing portions 24 and the stator holding portion 17 of the base member 13 may be fixed to each other by virtue of a burring. When an electric current is supplied from a power supply to the coils 15 via the PCB 12 and the lead wires 25, the magnetic fields generated in the stator core 14 interact with the magnetic fields formed in the magnet 20 as a magnetized multi-pole magnetic body, whereby a rotational moment is generated in the rotor holder 21. Thus, the rotor holder 21 is rotated together with the shaft 19.

Figure 2:
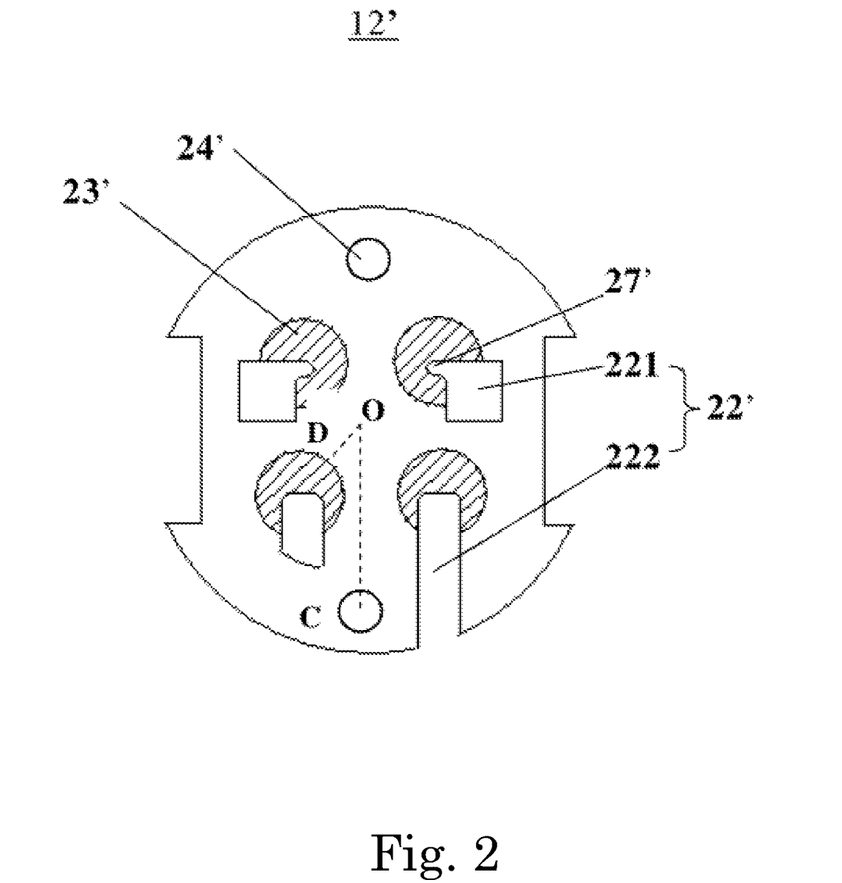
FIG. 2 is a front view showing a first example of a PCB employed in the motor shown in FIG. 1.

FIG. 2 is a front view showing one example of the PCB of the motor 10. The PCB 12' includes a plurality of through-hole portions 22' extending along the center axis O-O', a plurality of land portions 23' arranged on the lower surface of the PCB 12', and a plurality of PCB fixing portions 24'. As shown in FIG. 2, each of the through-hole portions 22' preferably includes a through-hole 221 and a cutout 222 extending from the outer edge of the PCB 12' toward the center axis O-O'. The through-hole portions 22' are equally arranged along the circumferential direction of the PCB 12'. At least a portion of each of land portions 23' is positioned radially inward of each of the through-hole portions 22'. The PCB fixing portions 24' are through-holes and are fixed to the stator holding portion by screws.

The distance OD from the radial inner end of each of the land portions 23' to the center axis O-O' is preferably equal to or shorter than one half of the distance OC from the center of each of the PCB fixing portions 24' to the center axis O-O'. Preferably, the through-hole portions 22' and the land portions 23' are adjacent to each other. The lead wires of the coils are led out radially inward through the through-hole portions 22'.

Preferably, each of the through-hole portions 22' includes an opening 27' defined at the radial inner end thereof. Each of the land portions 23' is arranged along the radial inner edge of the opening 27'. Each of the lead wires is led out toward each of the land portions 23' through the opening 27'.

Figure 3:
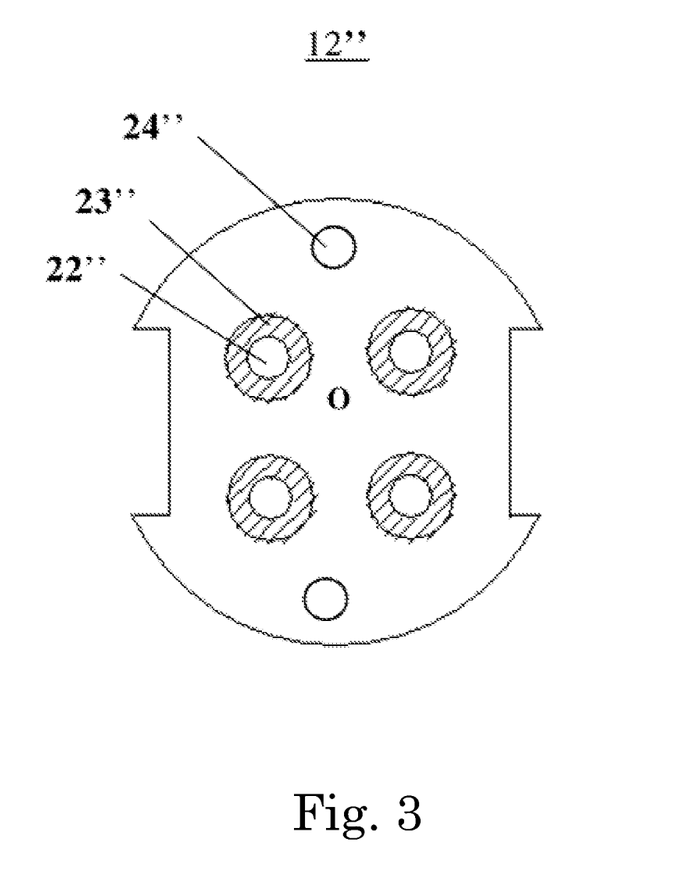
FIG. 3 is a front view showing a second example of a PCB employed in the motor shown in FIG. 1.

FIG. 3 is a front view of another example of the PCB of the motor 10 shown in FIG. 1. The PCB 12" preferably includes a plurality of through-hole portions 22" extending along the center axis O-O', a plurality of land portions 23" and a plurality of PCB fixing portions 24". As shown in FIG. 3, the through-hole portions 22" are through-holes equally arranged along the circumferential direction. Each of the through-holes is positioned at the center of each of the land portions 23".

Figure 4:
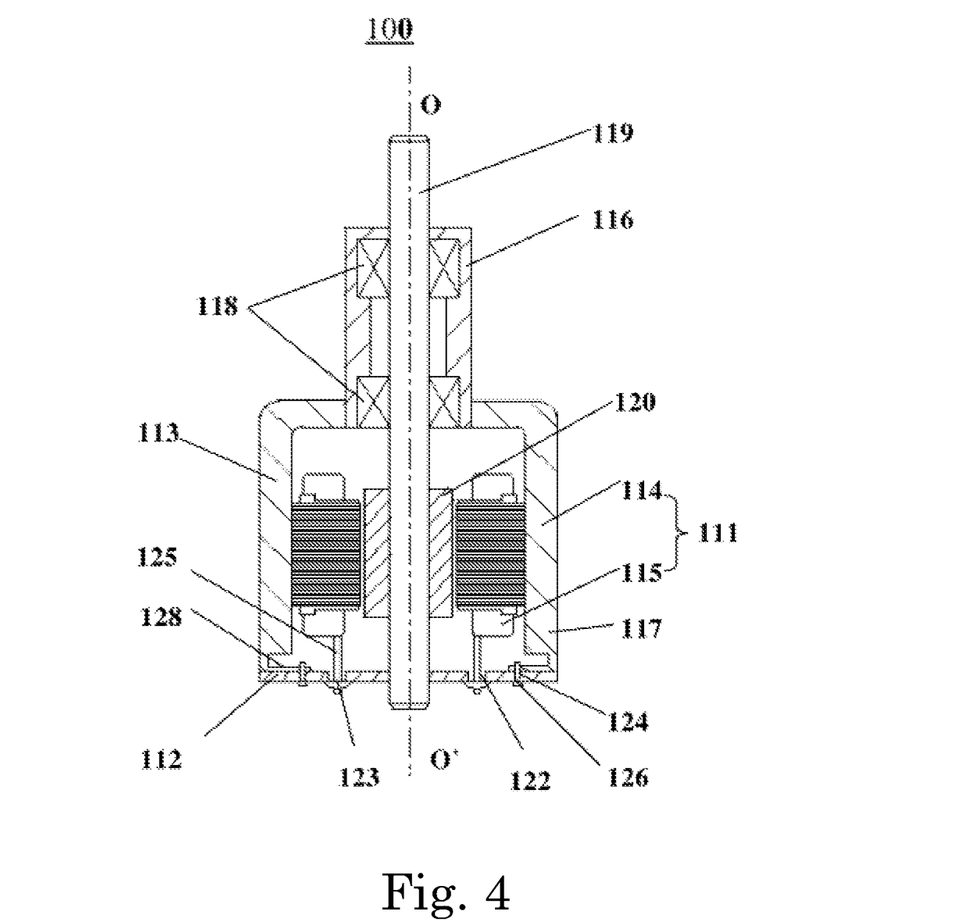
FIG. 4 is a sectional view of an inner-rotor-type motor according to another preferred embodiment.

FIG. 4 is a sectional view of an inner-rotor-type motor according to another preferred embodiment of the present invention. As shown in FIG. 4, the motor 100 preferably includes a stationary unit, a rotary unit arranged to rotate with respect to the stationary unit about the center axis O-O' extending up and down, and a bearing unit. The stationary unit preferably includes a stator 111, a PCB 112 and base member 113. The stator 111 preferably includes a stator core 114 and coils 115 defined by conductive wires wound around the stator core 114. The base member 113 preferably includes a bearing holding portion 116 arranged to hold the bearing unit and a stator holding portion 117 arranged to hold the stator 111. The bearing unit preferably includes radial bearings 118 which are press-fitted and fixed to the inner surface of the bearing holding portion 116. The stator 111 is supported on the inner surface of the stator holding portion 117 and is disposed axially below of the bearing unit.

The rotary unit preferably includes a shaft 119 and a magnet 120. The shaft 119 is positioned radially inward of the radial bearings 118 and is rotatably supported by the radial bearings 118 to rotate with respect to the stationary unit about the center axis O-O'. The magnet 120 is installed at an end portion of the shaft 119 opposite to the radial bearings 118 and is radially opposed to the inner circumferential surface of the stator core 114.

The inner-rotor-type motor 100 shown in FIG. 4 differs from the outer-rotor-type motor 10 shown in FIG. 1 in that the magnet 120 is positioned radially inward of the stator core 114. A through-hole through which the shaft 119 passes is defined in the central region of the PCB 112. As shown in FIG. 4, the PCB 112 axially overlaps with a portion of the bearing unit. The PCB 112 preferably includes a plurality of through-hole portions 122 extending along the center axis O-O', a plurality of land portions 123 arranged on the lower surface of the PCB 112, and a plurality of PCB fixing portions 124 arranged to fix the PCB 112 to the base member 113. The PCB 112 is arranged below the stator 111. The through-hole portions 122 are arranged along the circumferential direction around the center axis O-O'. The PCB fixing portions 124 are positioned radially outward of the through-hole portions 122. Lead wires 125 led out from the coils 115 are arranged to pass through the through-hole portions 122 and are soldered to the land portions 123. As shown in FIG. 4, the stator holding portion 117 preferably includes a radially-protruding seat 128. The PCB fixing portions 124 are fixed to the seat 128 of the stator holding portion 117 preferably by screws 126. The seat 128 is positioned radially outward of the through-hole portions 122.

Figure 5:
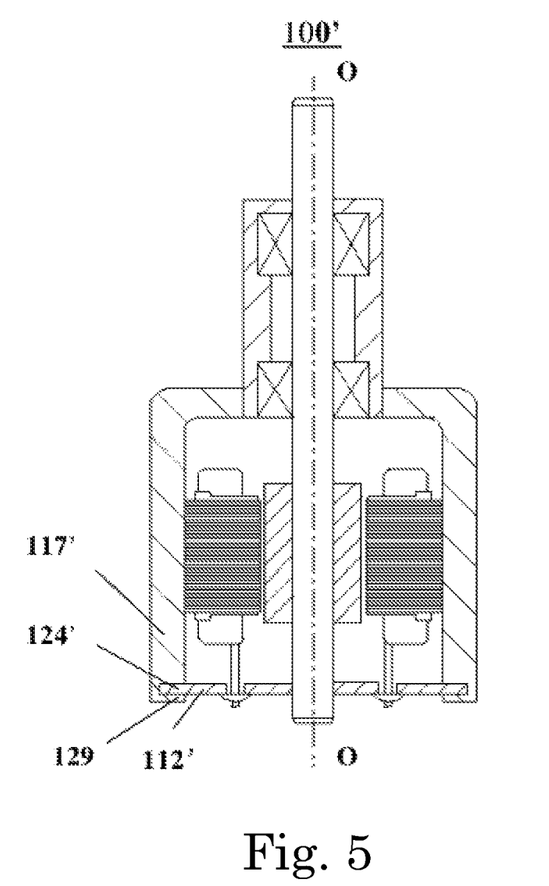
FIG. 5 is a sectional view showing a modified example of the inner-rotor-type motor shown in FIG. 4.

FIG. 5 is a sectional view showing a modified example of the inner-rotor-type motor shown in FIG. 4. The motor 100' shown in FIG. 5 differs from the motor 100 shown in FIG. 4 in that the PCB fixing portions 124' of the PCB 112' and the stator holding portion 117' are fixed to each other by a burring 129 of the stator holding portion 117'.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A motor, comprising:
a stationary unit;

a rotary unit arranged to rotate with respect to the stationary unit about a center axis extending up and down; and a bearing unit, wherein the stationary unit includes a stator, a PCB and a base member, the stator includes a stator core and coils defined by conductive wires wound around the stator core, the stator arranged radially outward of the bearing unit, the PCB includes a plurality of through-hole portions extending along the center axis, a plurality of land portions arranged on a lower surface of the PCB and a PCB fixing portion arranged to fix the PCB to the base member, the PCB arranged below the stator, the base member includes a stator holding portion arranged to hold the stator and a bearing holding portion arranged to hold the bearing unit, the rotary unit includes a shaft and a magnet, the shaft is positioned radially inward of the bearing unit and is rotatably supported by the bearing unit to rotate with respect to the stationary unit about the center axis, the magnet is opposed to a circumferential surface of the stator core, the through-hole portions are arranged along a circumferential direction of the PCB around the center axis, at least a portion of the PCB axially overlaps with the bearing unit, the PCB fixing portion is arranged radially outward of the through-hole portions, and lead wires led out from the coils are arranged to pass through the through-hole portions and are soldered to the land portions.

2. The motor of claim 1, wherein the magnet is positioned radially outward of the stator core.

3. The motor of claim 1, wherein the magnet is positioned radially inward of the stator core.

4. The motor of claim 1, wherein at least a portion of each of the land portions is positioned radially inward of the through-hole portions.

5. The motor of claim 4, wherein the distance from a radial inner end of each of the land portions to the center axis is equal to or shorter than one half of the distance from the center of each of the PCB fixing portions to the center axis.

6. The motor of claim 4, wherein the through-hole portions and the land portions are adjacent to each other, and the lead wires are led out radially inward through the through-hole portions.

7. The motor of claim 4, wherein each of the through-hole portions includes an opening arranged radially inward thereof, each of the land portions is arranged along a radial inner edge of the opening, and each of the lead wires is led out toward each of the land portions through the opening.

8. The motor of claim 1, wherein the through-hole portions are through-holes equally arranged along the circumferential direction of the PCB.

9. The motor of claim 8, wherein each of the through-holes is positioned at the center of each of the land portions.

10. The motor of claim 1, wherein the through-hole portions are cutouts equally arranged along the circumferential direction of the PCB and extending from an outer edge of the PCB toward the center axis.

11. The motor of claim 10, wherein at least a portion of each of the land portions is positioned radially inward of each of the cutouts.

12. The motor of claim 1, wherein the number of the through-hole portions and the number of the land portions are equal to each other.

13. The motor of claim 1, wherein the through-hole portions are arranged radially inward of an outer circumferential surface of the stator.

14. The motor of claim 1, wherein the distance from a radial inner end of each of the through-hole portions to the center axis is shorter than the distance from a radial inner end of the each of the PCB fixing portions to the center axis.

15. The motor of claim 1, wherein the stator holding portion includes a seat, the PCB fixing portion is fixed to the seat of the stator holding portion, and the seat is positioned radially outward of the through-hole portions.

16. The motor of claim 1, wherein the PCB fixing portion and the stator holding portion are fixed to each other by a screw or a burring.

* * * * *